United States Patent

Sterret, Jr.

[15] 3,704,609
[45] Dec. 5, 1972

[54] ROLLING MILL GAUGE CONTROL DURING ACCELERATION

[72] Inventor: John D. Sterret, Jr., Williamsville, N.Y.

[73] Assignee: Westinghouse Electric Corporation, Pittsburgh, Pa.

[22] Filed: June 25, 1971

[21] Appl. No.: 156,907

[52] U.S. Cl. .................................. 72/8, 72/19
[51] Int. Cl. ................................... B21b 37/12
[58] Field of Search ......................... 72/8, 19

[56] References Cited

UNITED STATES PATENTS

| | | |
|---|---|---|
| 3,036,480 | 5/1962 | Schwab ........................... 72/11 X |
| 3,081,654 | 3/1963 | Wallace ........................... 72/16 X |
| 3,531,961 | 10/1970 | Dunn ............................... 72/8 |
| 3,574,280 | 4/1971 | Smith, Jr. ........................ 72/8 |

Primary Examiner—Milton S. Mehr
Attorney—F. H. Henson et al.

[57] ABSTRACT

Rolling mill control system for controlling the output gauge of strip material being rolled during acceleration of the mill. This is accomplished by utilizing feed-forward computer techniques to anticipate changes in mill variables and to regulate those variables to maintain constant output gauge during acceleration. Feedback techniques are then used to trim-up the control system, to update the predictive model equations and to dynamically control gauge during acceleration.

7 Claims, 3 Drawing Figures

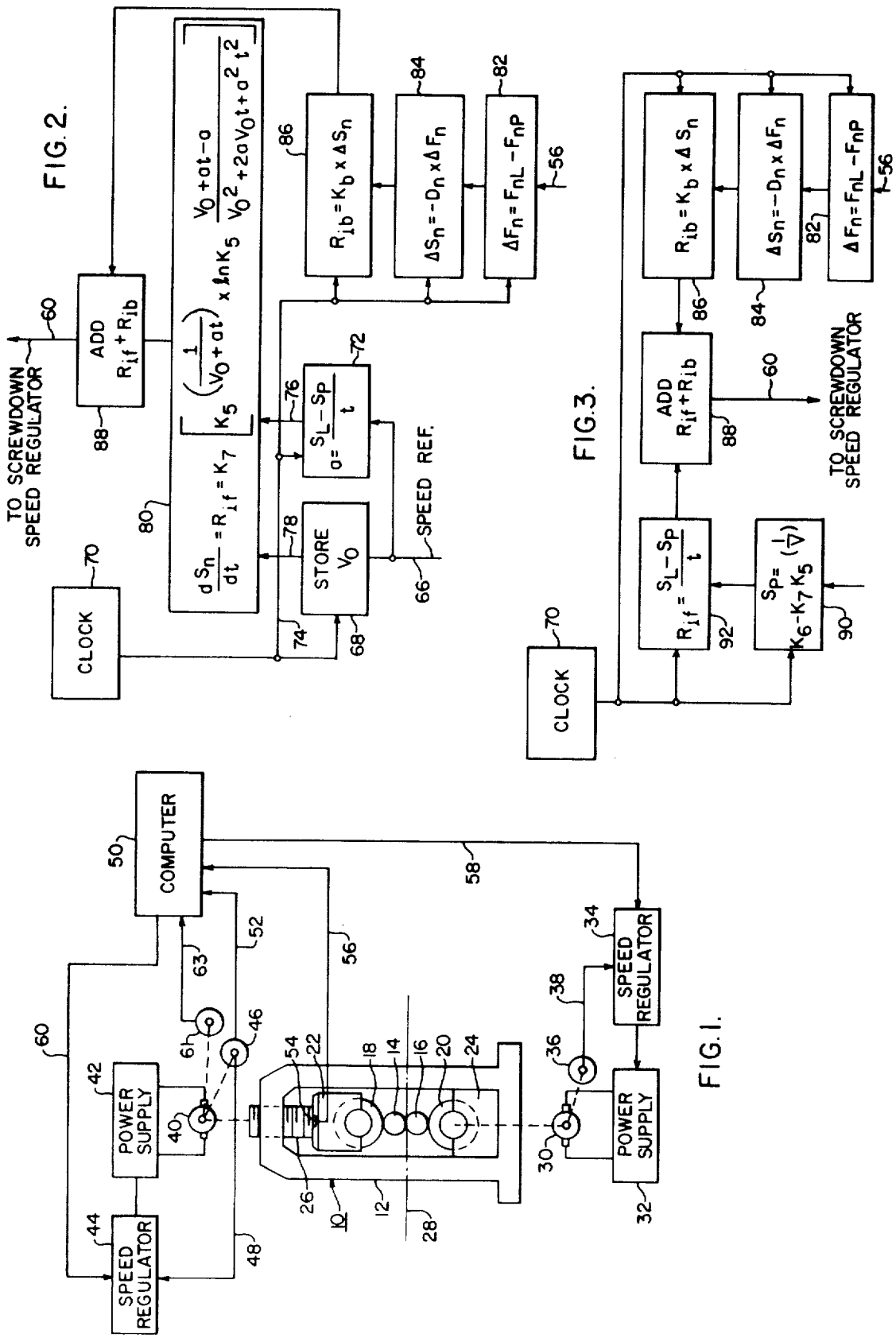

ROLLING MILL GAUGE CONTROL DURING ACCELERATION

BACKGROUND OF THE INVENTION

As is known, rolling mills are usually threaded at a slow or creep speed and are then accelerated, after threading, to a steady-state running condition. Examples of these mills are tandem cold mills, temper mills and hot strip mills. Acceleration of these mills produces a variety of interacting changes in mill variables which result in undesirable changes in finished product characteristics such as shape, temperature, gauge, and width. Mill variables causing these changes include roll openings, tensions, strip temperatures, roll forces, stand loadings and the like.

Predictive computer controls have been provided for rolling mills, but most of these are limited to static (setup) functions, while dynamic gauge control has been limited to feedback control. These systems work adequately for non-accelerating or slowly accelerating mills. The nature of feedback control systems requires an error in a measured variable to exist before corrective action is taken. For rapidly accelerating mills, rapid changes in mill parameters and product characteristics have prohibited feedback control systems from adequately controlling the process. As a result, mills are either accelerated slowly, or where fast accelerating rates are used, much of the product produced during the accelerating period has to be scrapped. Needless to say, considerable improvements in yield and production can be obtained if high accelerating rates without scrap loss are available.

SUMMARY OF THE INVENTION

In accordance with the present invention, a method for controlling the gauge of strip material issuing from a rolling mill during acceleration is provided comprising the steps of (1) generating a feedforward predictive electrical signal proportional to the rate of change of a mill variable necessary to maintain constant output gauge from a consideration of the acceleration rate of the mill, (2) generating a feedback electrical signal proportional to the rate of change of the mill variable from a consideration of a variation in actual output gauge from a desired constant output gauge, and (3) controlling the mill variable to maintain output gauge constant from a consideration of both the feedforward and feedback signals.

As is known, feedforward control anticipates an error in the controlled variable due to anticipated changes in certain secondary variables. As an example, if it is known that the rolling mill will be accelerated over a period of time, the feedforward control can anticipate that the position of each stand screw should vary at a certain rate, the interstand tensions should vary at a certain rate, and so on, in order to insure that undesirable changes in strip gauge will not occur. These changes in rate of change in a controlled variable required to counteract anticipated changes in a product variable rather than changes to counteract existing errors as in feedback control.

Two types of feedforward control are described in this specification. The first method measures present conditions; and based upon these conditions and anticipated changes in other conditions, the rate of change in a controlled variable is outputted from a controller. In one embodiment of the invention shown herein, a speed reference for the rolling mill screwdown is outputted in order to effect a change in screw position. This output then changes the screw position to maintain constant the gauge of the issuing strip material.

The second type of feedforward control described herein is based upon the calculation of statics. At a particular instant, a calculation is made of the conditions that will exist a short segment of time later. Based upon these calculations, additional calculations are made of the changes in status of the controlled variables necessary to hold the product characteristics at their desired conditions. Based upon the desired new changes in controlled variable status (e.g., screw position), rates of change of these status conditions are outputted from the controller.

As an example, the system can be used to make screw changes in order to control gauge during acceleration of a hot strip finishing mill. It will be assumed that the sample interval is one-tenth of a second and that the controller is a computer and can make the necessary calculations in a time period very short compared with the one-tenth second interval. The controller measures the various mill conditions including speed, gauge, screw position and roll force. The present stand measured screw position can be identified as $S_1$. The computer then calculates the desired stand screw position $S_2$ required to provide the desired product characteristics one-tenth second in the future. The screw feedforward speed reference will then be calculated by the formula:

$$(S_1 - S_2)/(\text{TIME INTERVAL})$$

Note that the shorter the time interval, the closer $S_1$ becomes to $S_2$ and the closer that the sampling approaches an analog output.

The feedforward screw speed reference derived by either one of the foregoing methods is then added to a feedback screw speed reference and the total screw speed reference is transmitted to the screw speed controller. In this manner, the rate of change of speed of the screwdown can be regulated to maintain constant output gauge from the rolling mill.

The above and other objects and features of the invention will become apparent from the following detailed description taken in connection with the accompanying drawings which form a part of this specification, and in which:

FIG. 1 is an illustration of a rolling mill of the type of which the present invention can be used and showing the inputs to a computer for controlling the screwdown for the mill;

FIG. 2 is a block diagram of a hard-wired system which may be used to implement the control system of the invention in accordance with one control scheme; and FIG. 3 is a block diagram of a hard-wired system which may be used to implement another control scheme in accordance with the teachings of the invention.

With reference now to the drawings, and particularly to FIG. 1, a rolling mill 10 is shown which includes a stand 12 which carries work rolls 14 and 16. The work rolls 14 and 16 are backed up by back-up rolls 18 and 20, respectively. These back-up rolls 18 and 20 are carried in chocks 22 and 24, the chock 22 being movable and connected to a screwdown mechanism, schematically illustrated at 26. The screwdown mechanism 26, in accordance with usual practice, is utilized to vary the spacing between the work rolls 14 and 16 and establishes the rolling force imparted to strip material 28 passing through the mill.

The rolls are driven by means of a drive motor 30 connected through a power supply 32, such as a thyristor power supply or generator, to a speed regulator 34. Connected to the motor 30 is a tachometer generator 36 which provides, on lead 38, a speed feedback signal to the speed regulator 34. The screwdown mechanism 26 is driven by motor 40 which, in a similar manner, is connected through power supply 42 to a speed regulator 44. The motor 40 is connected to a tachometer generator 46 which produces a speed feedback signal to the speed regulator 44 on lead 48. As will be understood, however, the motor 40 and screwdown mechanism 26 could be replaced by means of hydraulic cylinders or the like with the same overall effect.

The speeds of the mill rolls and the screwdown mechanism 26 are controlled by means of computer apparatus, schematically illustrated at 50 in FIG. 1. Fed to the computer apparatus 50 via lead 63 is a position signal from position sensor 61. A roll force signal derived from strain gauge 54 or the like is fed back to the computer via lead 56. The outputs from the computer 50 include the speed reference signal on lead 58 to the speed regulator 34, and a speed reference signal on lead 60 to the speed regulator 44. As will be hereinafter explained, the system is such that the speed regulator 44 causes the screwdown mechanism 26 to vary the roll gap spacing as the speed of the mill increases during acceleration (or deceleration) to maintain a constant output gauge from the mill. It will be appreciated, of course, that the stand 10 can be included in a tandem rolling mill, in which case similar controls, hereinafter described, will be provided for each stand in the mill.

Assuming that the stand 10 shown in FIG. 1 is one of several stands in tandem in a hot strip finishing mill, hot steel is threaded through all stands at a fixed speed, usually about 2000 feet per minute. After the steel is in all stands, the mill is accelerated as a unit, the acceleration being controlled by the signal on lead 58 in FIG. 1.

It is axiomatic that the volume of material entering the bite of the rolls 14 and 16 is equal to the volume of material leaving. This can be expressed as:

(1) $\quad H_{in} \times V_{in} = H_{out} \times V_{out}$ where $H_{in}$ and $H_{out}$ = strip thickness or gauge at the entrance and exit sides of the mill, respectively, and $V_{in}$ and $V_{out}$ = strip velocity at the entrance and exit sides of the mill, respectively.

The thickness delivered from a stand can be calculated by the equation:

(2) $\quad H_n = S_n + D_n F_n + \phi_n$ where $H_n$ = strip thickness delivered through a stand $n$,
$S_n$ = unloaded screw opening for stand $n$,
$D_n$ = mill spring constant for stand $n$,
$F_n$ = roll force exerted in stand $n$ from making the reduction, and
$\phi_n$ = offset for stand $n$ (constant value).

The roll force, $F_n$, for a given stand can be predicted by a roll force model equation such as the following Equation (3):

(3) $\ln F = \ln W + \frac{1}{2} \ln R\Delta H + b_0 + b_1 \ln (\Delta H)/(H) + b_2 \ln (R/H) +$ $b_3 (\ln (\Delta H/H))(\ln (R/H)) + b_4 T$ where
$F$ = predicted force,
$W$ = width of the strip,
$R$ = work roll radius
$\Delta H$ = draft,
$H$ = H out,
$T$ = temperature, and
$b_n$ = constant term of the nth term.

The temperature can be predicted from a temperature model which will take the following form for a limited range, assuming temperature drop is caused by conduction to the rolls:

(4) $\quad T = \theta - C\theta t + T_w$ where
$C$ = a constant,
$\theta$ = initial temperature,
$t$ = time in the rolls, and
$T_w$ = temperature increase from work input to the steel.

The time t in the rolls can be written as:

(5) $\quad t = (A/V)$ where
$A$ = the arc of contact of the steel with the rolls, and
$V$ = the speed of the stand.

It is desired to deliver constant gauge from the stand as the mill is accelerated. In order to simplify the required mathematics, it will be assumed that the following values do not vary significantly during acceleration of the mill:

$W, R, \Delta H, H, C, \theta, A, T_w, K_n,$ and $\phi_n$

By combining equations and summing constant terms, we can write:

$$T = K_1 - \frac{K_2}{V}$$

$$\ln F = K_3 + b_4 \left( K_1 - \frac{K_2}{V} \right)$$

$$\ln F = \ln K_4 + \frac{1}{V} \ln K_5$$

$$\ln F = \ln \left( K_4 \times K_5^{\left(\frac{1}{V}\right)} \right)$$

$$F = K_4 \times K_5^{\left(\frac{1}{V}\right)}$$

$$H_{out} = S_n + D_n \times K_4 \times K_5^{\left(\frac{1}{V}\right)} + \phi_n$$

or (6) $\quad S_n = H_{out} - D_n \times K_4 \times K_5^{(1/V)} + \phi_n$

Since it is desired to hold $H_{out}$ constant, we can write, by combining constants:

(7) $\quad S_n = K_6 - K_7 K_5^{(1/V)}$ or on a differential basis:

$$\frac{dS_n}{dt} = -\left[ K_7 \times \left(K_5^{(1/V)}\right) \times \ln K_5 \left[\frac{d(1/V)}{dt}\right] \right]$$

The velocity, V, of the issuing strip material is:

(8) $\quad V = V_0 + at$ where
$V_0 =$ initial threading speed of the mill,
$a =$ acceleration rate of the mill, and
$t =$ time after start of acceleration.

Equation (8) can be written as:

(9) $\quad (1/V) = (1/V_0 + at)$ or $$\frac{d(1/V)}{dt} = \frac{V - \frac{dv}{dt}}{V^2} = \frac{V_0 + at - a}{V_0^2 + 2aV_0 t + a^2 t^2}$$

and

(10)
$$\frac{dS_n}{dt} = -K_7 \left[ K_5^{(1/V_0 + at)} \times \ln K_5 \frac{V_0 \times a(t-1)}{V_0^2 \times 2aV_0 t \times a^2 t^2} \right]$$

Equation (10), therefore, represents the speed of the screws to hold delivery gauge constant throughout an accelerating period. Assuming that the response time of the screws can be neglected, this speed can be represented as:

(11) $\quad R_{lf} = (ds_n/dt)$ where
$R_{lf} =$ stand screw speed reference required to hold delivery gauge constant from stand during accelerating period by using predictive techniques.

In a practical application, it may be desirable to make even more simplifying assumptions or to devise equations for temperature and force which are in a form more suitable to the application.

The quantity $R_{lf}$, therefore, represents a predictive feedforward electrical signal proportional to calculated or predicted screw speed to maintain output gauge constant. In addition to the feedforward signal, however, the present invention utilized a feedback control signal derived from an attempt to control the stand screwdowns in order to hold delivery gauge constant. In this respect, Equation (2) above can be written in incremental form as follows:

(12) $\quad \Delta H_n = \Delta S_n + D_n \times \Delta F_n + \Delta \phi_n$

Since it is desired to maintain $\Delta H_n$ equal to zero and since $\phi_n$ will not vary materially, Equation (12) can be rewritten as:

(13) $\quad \Delta S_n = -D_n \times \Delta F_n$

With the screw speed reference determined by a linear relationship, we can write:

(14) $\quad R_{tb} = K_b \times \Delta S_n$ where
$R_{tb} =$ stand screw speed reference required to remove an existing error in the stand delivery gauge.

Combining Equations (11) and (14) results in:

(15) $\quad R_T = R_{lf} + R_{tb}$ where
$R_T =$ the total speed reference to the screwdown controller.

In the case where a digital process control computer is used, such as computer 50 in FIG. 1, this same computer will be used to set the mill screw positions and speeds for the thread condition, before acceleration starts. The computer 50 will also perform the position regulation for the screwdowns. This can be achieved by the computer very quickly sampling the screw position feedback via lead 52, comparing the feedback with the desired screw opening reference, and providing a screw speed reference via lead 60 to the screwdown speed regulator 44. The computer will also perform automatic gauge control for the mill. Using normal high frequency computer sampling techniques, the computer 50 will calculate $R_T$, using predictive feedback terms, on a time basis such as once every one-tenth second. In a tandem mill, the stands succeeding the stand shown in FIG. 1 will be controlled in a similar manner. This will insure that the gauge delivered from each stand is constant and, thus, that the gauge delivered from the mill will be held constant. The equations involving temperature (i.e., Equations (3) and (4) above) become more complicated for the latter stands in a tandem mill since the temperature decay in a latter stand is dependent upon the decay in earlier stands. The output gauge feedback can be included and applied to the computer 50 in a conventional manner.

Instead of using the computer shown in FIG. 1, a hardwired logic system such as that shown in FIG. 2 can be used equally as well. The speed reference derived from tachometer 36, for example, is applied via lead 66 to circuit 68 where the initial speed $V_0$ at the start of acceleration is stored. The initiation of pulses from a clock 70 begin when the acceleration period is started. At the same time, the speed reference is applied to circuit 72 which is activated via lead 74 once each one-tenth second, for example, to subtract the present speed reference $S_P$ from the last speed reference $S_L$ (i.e., that occuring one-tenth second before). The quantity $S_L - S_P$ is divided by the elapsed time $t$ (e.g., one-tenth second) to derive a signal on lead 76 proportional to acceleration, $a$. The signal $V_0$ on lead 78 as well as the signal $a$ on lead 76 are then applied to circuit 80 which computes Equation (10) given above. The quantity $R_{lf}$ is computed in circuit 80 once each one-tenth second. In this respect, note that the output of the clock 70 is also applied to circuit 80.

The roll force signal on lead 56 is applied to circuit 82 where the quantity $\Delta F_n$ is determined by subtracting the present roll force reading $F_{np}$ from the last roll force reading $F_{nl}$ (i.e., the roll force reading taken one-tenth second before). This computation is again controlled by the pulses from clock 70 occurring every one-tenth second. The quantity $\Delta F_n$ is then applied to circuit 84 where $\Delta S_n$ is computed from a consideration of $D_n$ (a constant) and $F_n$ every one-tenth second. The quantity $\Delta F_n$ is then applied to circuit 86 where the quantity $R_{tb}$ is derived from a consideration of the constant $K_b$ and $\Delta S_n$ in accordance with Equation (14) above. Finally the quantities calculated in circuits 80 and 86 are added in circuit 88 to derive the quantity $R_T$ which is the total reference speed to the screwdown controller. This is applied to the screwdown controller via lead 60 as shown in FIG. 1.

Instead of computing the desired speed of the screws from Equation (10) above, it is also possible to obtain the stand screw speed reference $R_{tf}$ by computing the desired predictive feedforward screw position at spaced intervals and by subtracting successive calculated positions and dividing by the time interval to obtain the required screw speed.

This type of control, for example, can be used on a hot strip finishing mill. Mills of this type ordinarily include computer control techniques which have the ability to set the finishing mill thread speeds and screw positions in the proper manner to obtain average desired output gauge and to distribute standard horsepower loadings in a desired manner. This set-up is based upon a given incoming temperature, delivery speed, and specific mill and steel parameters. The incoming bar temperature is a function of the history when the head end reaches the finishing mill and the time required to roll the piece in the mill which is a function of thread speed and mill acceleration. Thus, for a given mill and given steel condition, the present technology is sufficient to predict the screw positions and speeds of the finishing mill stands required to produce a given gauge and to predict the finish temperature based upon average conditions. The present technology is also capable of providing updating of the model equations used to make these predictions based upon measured mill and steel conditions. This updating primarily consists of measuring roll force and updating force predictions, measuring the finish thickness with the use of an X-ray gauge and strip speed and updating stand offsets ($\phi_n$), and measuring the temperature and updating predictions.

The novel control system described herein utilizes the control capabilities described above. It will be assumed that the computer has set the finishing speeds and screws for an upcoming bar. As the head end progresses through the mill, the normal roll force feedback gauge control can be turned on for each stand after the head end enters the stand. That is, the $R_{tb}$ term of Equation (14) above would be activated but the $R_{tf}$ term would remain temporarily at zero. When the strip has been threaded through the mill, X-ray feedback is normally turned on and the system continues to function in the same manner throughout the length of the strip.

After threading in the manner described above, acceleration is initiated and feedforward control commences. The feedforward control performs by making a schedule calculation for the anticipated conditions that will exist, for example, one-tenth second from the present instant. It will be assumed that the calculations are designed to adjust the screw positions only, although this is not a necessary condition for the operation of the system. Therefore, the stand speeds will remain fixed in relation to one another, although the mill is accelerating as a whole. Thus, the conditions that have changed since the previous calculation will be the speeds of the stands, the incoming temperature to the finishing mill, and the attendant changes in roll force, gauge, shape, and temperature. After a new calculation has been made, new screw positions for each stand will result which are required one-tenth second from the present instant. The feed-forward control can thus calculate the quantity $R_{tf}$ by measuring the present screw position and subtracting the desired screw position one-tenth second from the present and dividing by the one-tenth second time interval to arrive at the screw speed reference $R_{tf}$.

A hard-wired logic system for achieving control in the manner described above is shown in FIG. 3 wherein elements corresponding to those of FIG. 2 are identified by like reference numerals. In this case, however, the speed reference on lead 66 is applied to circuit 90 where the present screw position $S_P$ is calculated from Equation (7) given above. This occurs once every one-tenth second as controlled by the clock 70. The present screw position from circuit 90 is then applied to circuit 92 where it is subtracted from a stored value of screw position $S_1$ determined one-tenth second before and divided by the time interval $t$. This, then is the screw speed feedforward reference $R_{tf}$ which is applied to circuit 88 where it is added with the quantity $R_{tb}$ derived in the same manner as described above in connection with FIG. 2.

Although the invention has been shown in connection with certain specific embodiments, it will be readily apparent to those skilled in the art that various changes in form and arrangement of parts may be made to suit requirements without departing from the spirit and scope of the invention. In this respect, it will be apparent that while the invention has been described in connection with hot strip mills, it can also be used on tandem cold mills. Normally, tandem cold mills are threaded at a creep speed through several stands, the head end being started on the winding reel and tension established prior to initiating acceleration. The mill is then accelerated to running speed. Using conventional feedback techniques, the first portion of the strip is lost due to off-gauge material. Actually, the feedback type automatic gauge control systems usually used are not turned on until the strip has reached approximately one-half speed.

The control approach for the hot strip mill can be used equally as well for tandem cold mills, although the model equations do have some differences. Equation (2) must be modified to fit a cold mill rolling thin products. $\phi_n$ varies considerably more for a cold mill stand than for a hot mill. This is caused by roll heating and oil film changes as the strip accelerates. Also, extrusion effects from the large tensions usually used on cold mills must be compensated for. Equation (3) given above was developed primarily for hot mills and must have a revision of form to fit cold mills. A primary change required is to include terms to accommodate effects from tension between the various stands and between the stands and the reel. In addition, roll flattening and effects from the edges of the rolls being in contact while the strip is in the mill cause roll forces to be generated that cannot be used to determine gauge in Equation (2) above. Aside from this, however, the control system is essentially the same as that for a hot mill.

I claim as my invention:

1. In the method for controlling the gauge of strip material issuing from a rolling mill during acceleration of the mill; the steps of generating a feedforward predictive electrical signal proportional to the rate of change of a mill variable necessary to maintain constant output gauge from a consideration of the acceleration rate of the mill, generating a feedback electrical signal proportional to the rate of change of said mill variable from a consideration of variation in actual output gauge from a desired constant output gauge, and controlling said mill variable to maintain output gauge constant from a consideration of both said feedforward and feedback signals.

2. The method of claim 1 wherein said mill variable is controlled by an electrical signal proportional to the sum of said feedforward and feedback signals.

3. The method of claim 1 wherein said mill variable comprises the speed of a screwdown drive motor.

4. The method of claim 1 wherein said mill variable comprises the speed of a screwdown drive motor for the mill and wherein said feedforward predictive electrical signal is derived by computing the desired present screw position and subtracting the present desired screw position from the calculated desired screw position existing a time interval before, and dividing by said time interval.

5. The method of claim 1 wherein said mill variable comprises the speed of a screwdown drive motor for the mill and wherein said feedforward predictive electrical signal is derived by calculating:

$$K_7\left[\left(\frac{1}{V_0+at}\right) \times \ln K_5 \frac{V_0+at-a}{V_0^2+2aV_0t+a^2t^2}\right]$$

where
$V_0$ = speed of the mill at the start of acceleration,
$a$ = acceleration rate of the mill,
$t$ = elapsed time following the start of acceleration, and
$K_7$ and $K_5$ are constants.

6. The method of claim 1 wherein said feedback electrical signal is calculated from:

$$K_b \times D_n \times \Delta F_n$$

where
$K_b$ is a constant,
$D_n$ is the mill spring constant, and
$\Delta F_n$ is the difference in roll force between one calculation and the calculation taken a time period $\Delta t$ before.

7. The method of claim 6 wherein said feedback electrical signal is calculated each time the time period $\Delta t$ elapses.

* * * * *